J. S. KIDD & M. MELVILLE.

Culinary-Pot.

No. 129,034.

Patented July 16, 1872.

Witnesses:
A Bennerkendorf.
W. A. Graham

Inventor:
J. S. Kidd
Mrs Mary Melville
PER
Attorneys.

No. 129,034

UNITED STATES PATENT OFFICE.

JOHN S. KIDD AND MARY MELVILLE, OF BROOKLYN, NEW YORK.

IMPROVEMENT IN CULINARY POTS.

Specification forming part of Letters Patent No. 129,034, dated July 16, 1872.

Specification describing a new and Improved Culinary Pot, invented by JOHN S. KIDD and Mrs. MARY MELVILLE, of Brooklyn, in the county of Kings and State of New York.

Our invention consists of a cluster of two or more independent boiling-pots, adapted for use, singly or together, in one ordinary pot-hole of a stove, as will be hereinafter set forth.

Figure 1:
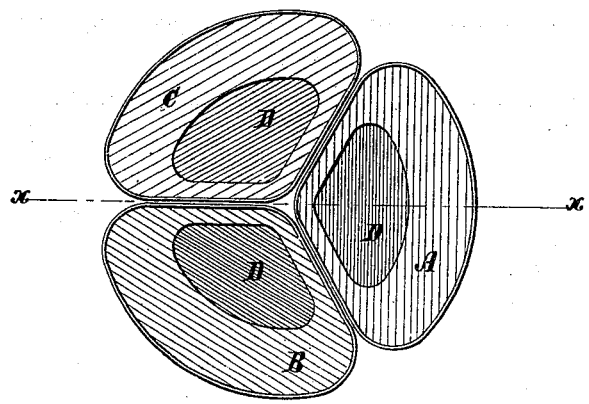
Figure 3:
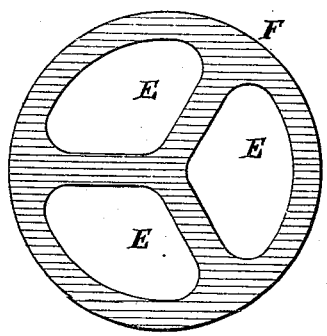
Figure 2:
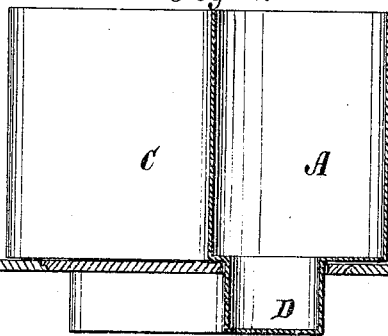

Figure 1 is a top view of a pot constructed according to our improvement. Fig. 2 is a sectional elevation taken on the line $x\ x$ of Fig. 1; and Fig. 3 is a plan, showing the arrangement of holes on the stove-cover adapted for our cluster of pots.

Similar letters of reference indicate corresponding parts.

In this example we have represented the pot divided into three sections and compartments, A B C, which we consider the best, practically; but we may have two or more, as preferred. The parts D represent the sections corresponding to the bottom projection of an ordinary pot, extending down through the top plate of the stove. The form of the sectional pots will vary somewhat by the number of sections in a cluster, but it will generally be about as represented in the drawing. The rounded form is given to the corners to facilitate the cleaning of them.

The stove-cover will have a corresponding cluster of holes, E, for these pots, and a cover for each, so that when all are not used the unused holes can be covered.

To use our improved pot on stoves with the ordinary round pot-holes, we may have a cover, F, therefor, with the appropriate holes E in it; but this will not be essential when all the pots are used.

These pots will be very useful with parlor cook-stoves having only one hole; also on ordinary cook-stoves in summer, when it is preferred to have a small fire concentrated under one ordinary pot-hole.

Having thus described our invention, we claim as new and desire to secure by Letters Patent—

1. A cluster of two or more independent pots, A B C, adapted for use in one ordinary pot-hole of a stove, substantially as specified.
2. The combination, with the said cluster of pots, of a cover, F, for ordinary pot-holes, having holes E, substantially as specified.

JOHN S. KIDD.
MARY MELVILLE.

Witnesses:
WM. H. KIDD,
G. MELVILLE.